United States Patent [19]

Riggs

[11] Patent Number: 4,470,799

[45] Date of Patent: Sep. 11, 1984

[54] CONVERTER IGNITER

[75] Inventor: George L. Riggs, Alleghany, N.Y.

[73] Assignee: CF Industries, Inc., Long Grove, Ill.

[21] Appl. No.: 311,282

[22] Filed: Oct. 14, 1981

[51] Int. Cl.³ .............................................. F23Q 2/28
[52] U.S. Cl. .................................... 431/266; 431/264; 279/99; 285/160; 285/165
[58] Field of Search ............... 431/263, 264, 265, 266; 74/89.2; 279/99; 285/160; 60/39, 826; 285/165

[56] References Cited

U.S. PATENT DOCUMENTS

| | | | |
|---|---|---|---|
| 1,121,386 | 12/1914 | Means | 279/99 |
| 2,013,979 | 9/1935 | Bray | 431/266 X |
| 2,619,345 | 11/1952 | Davidson | 74/89.2 |
| 2,880,792 | 4/1959 | Raskin | 431/263 |
| 3,892,206 | 7/1975 | Kobayashi | 60/39.826 |

FOREIGN PATENT DOCUMENTS 116634  6/1918  United Kingdom ................ 285/160

Primary Examiner—Samuel Scott
Assistant Examiner—Allen J. Flanigan
Attorney, Agent, or Firm—Trexler, Bushnell & Wolters, Ltd.

[57] ABSTRACT

A converter igniter is provided for igniting a converter screen assembly which acts as a catalyst for vapor phase oxidation of ammonia in a nitric acid reduction process. The igniter includes an elongate gas delivery tube and structure for sealably mounting the gas delivery tube with one end thereof within the vapor phase oxidation chamber. An igniting structure is provided at the end of the elongate gas tube includng a spark plug completely recessed within the end of the tube and a plurality of apertures in the tube end for producing a diffuse flame. An elongate rod-like conductor is concentrically mounted within the gas delivery tube and electrically and physically isolated therefrom by means of a concentrically mounted surrounding insulator structure. The structure for sealingly mounting the elongate tube to the vapor phase oxidation chamber includes a releasable sealing structure for selectively permitting slideable movement of the elongate tube, generally in the direction into and out of the chamber and further includes a ball joint through which the tube is slideably movable for further permitting angular motion of the tube within the chamber.

8 Claims, 4 Drawing Figures

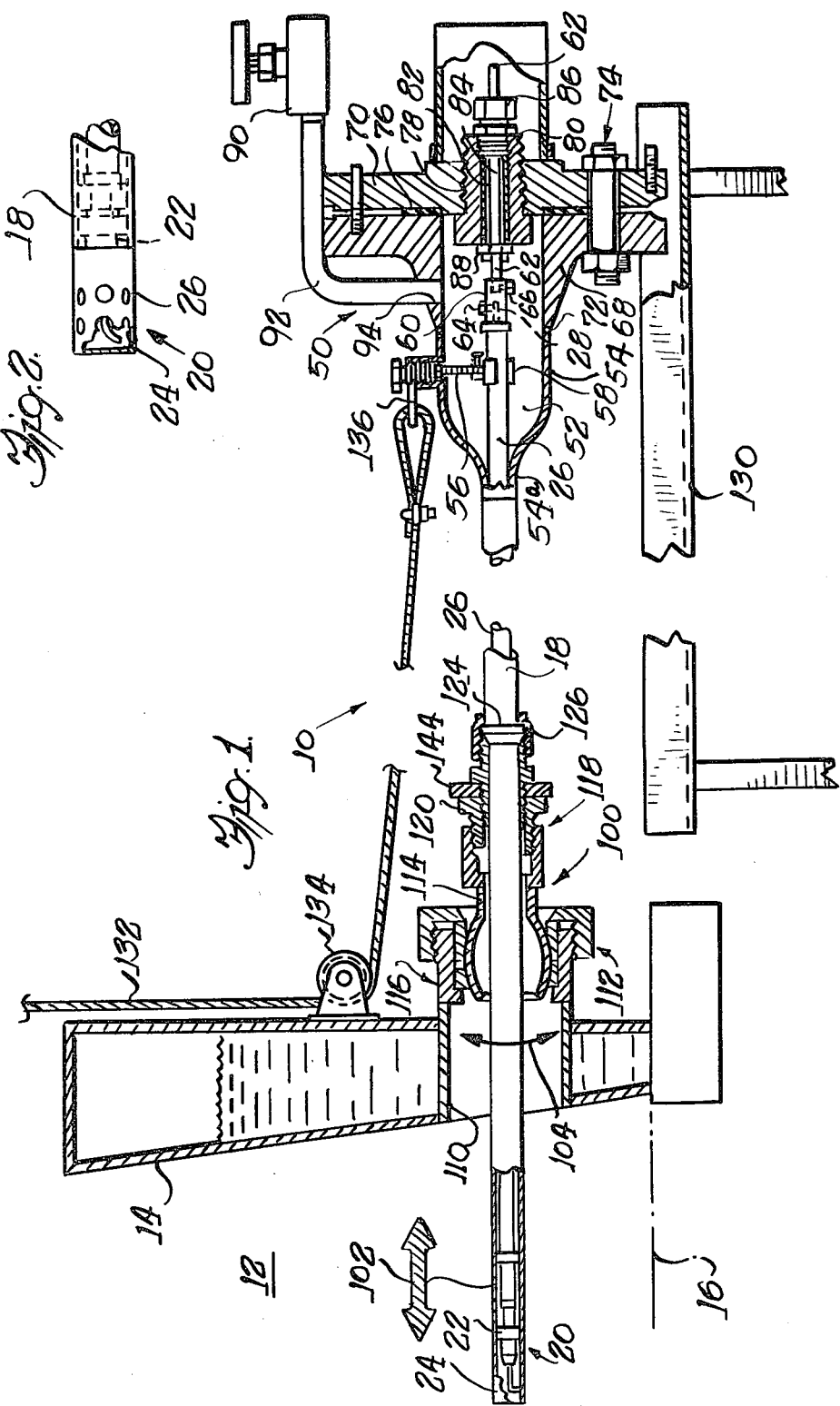

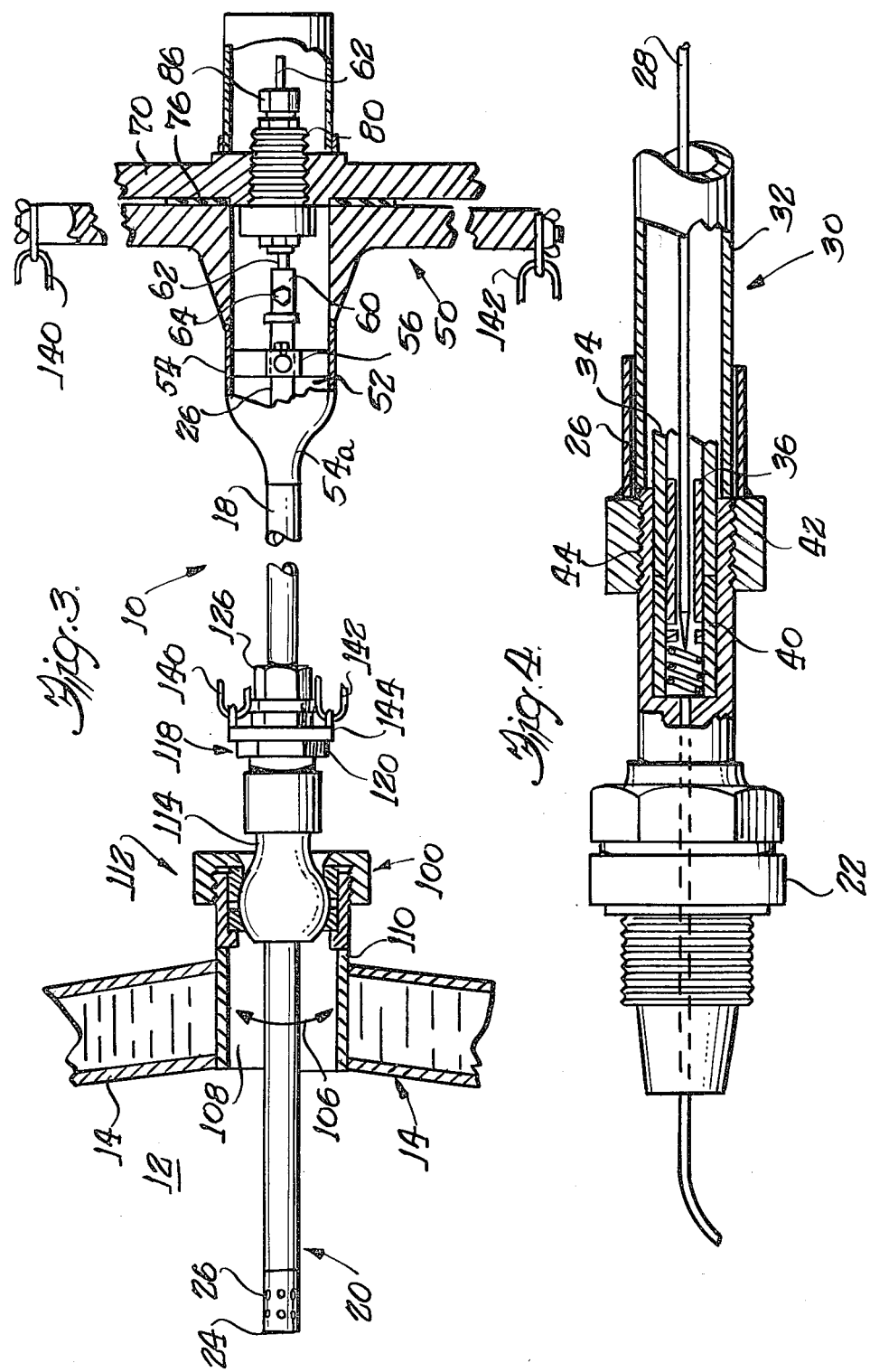

CONVERTER IGNITER

BACKGROUND OF THE INVENTION

The present invention is directed generally to an igniter structure and more particularly to an igniter of the type utilized to ignite a converter screen assembly which acts as a catalyst for vapor phase oxidation of ammonia in a nitric acid plant.

In a typical nitric acid plant, a pad or sheet of platinum-rhodium screens is used as a catalyst for vapor phase oxidation of ammonia in a part of the nitric acid reduction process. This screen assembly is heated to a sufficient degree to cause "burning" of the hydrogen in the ammonia with the oxygen in the air to produce an enriched nitrogen or "nitric oxide" product. This nitric oxide product is then further processed to become nitric acid.

Conventionally, the screen assembly or "gauze" is mounted in a generally horizontal orientation within a sealed chamber into which a mixture of ammonia and air at the proper temperature is fed. Thereupon, the screen or gauze must be heated sufficiently to cause ignition of the ammonia and air mixture. This ignition tends to occur in a limited area of the screen at first, whereupon the area of ignition gradually increases until ignition occurs substantially throughout the screen.

One significant problem in prior art arrangements has been to provide an effective igniter structure for initiating the ignition process in the screen or gauze. In one prior art arrangement this ignition was accomplished by means of a high resistance "glow wire" mounted on a pair of conductive rods which were rigidly mounted through the sealed chamber wall for delivering electrical power to the glow wire. However, in practice, the positioning of the glow wire with respect to the screen or gauze proved critical and very difficult to accomplish. Repositioning was accomplished by bending the mounting rods to the desired position, which required shutdown of the process for entry to the sealed chamber and subsequent re-sealing.

If the glow wire were positioned too far from the screen, ignition would not occur. On the other hand, if the glow wire were too close to the screen, vibrations caused by the air and gas flow in the chamber could cause the screen to strike the relatively fragile glow wire causing breakage of the wire and/or possible damage to the screen. Such breakage and damage require complete shut down of the process for expensive and time consuming repair of the screen and/or glow wire.

The foregoing structure was improved upon by replacing one of the electrode rods for the glow wire with a tube through which hydrogen gas was passed to convert the igniter to a small hydrogen torch. That is, the glow wire was utilized to cause ignition of the hydrogen, producing a relatively hot, concentrated flame for igniting the gauze or screen. However, breakage of the glow coil due to improper positioning too close to the screen or gauze still often occurred. Additionally, the relatively concentrated flame tended to impinge in a relatively small area of the screen or gauze. Hence, careful control of hydrogen delivery and pressure proved necessary. If the hydrogen pressure became too great or the flame was allowed to burn for too long a period, burning or melting of the screen or gauze and associated support structure would occur, again necessitating costly shutdown and repair.

OBJECTS AND SUMMARY OF THE INVENTION

Accordingly, it is a general object of the invention to provide a novel and improved converter igniter structure which avoids the problems of the prior art.

A more specific object is to provide such a converter igniter structure which is readily movable with respect to the screen to permit controlled ignition.

Another object is to provide such a converter igniter structure which may be readily repositioned during the ignition process.

A further object is to provide such a converter igniter structure which produces a diffuse flame.

Briefly, and in accordance with the foregoing objects, a converter igniter for vapor phase oxidation of ammonia in a nitric acid reduction process commprises means for producing a diffuse flame and means for controllably and movably mounting said flame-producing means relative to a screen for controlling the position of said diffuse flame relative to the screen.

BRIEF DESCRIPTION OF THE DRAWINGS

The foregoing, as well as other objects, features and advantages of the invention will be more readily appreciated upon consideration of the following detailed description of the illustrated embodiment, together with reference to the accompanying drawings, wherein:

FIG. 1 is a side elevation, partially in section of a converter igniter in accordance with the invention;

FIG. 2 is an enlarged view, partially in section and partially cut away of an air/gas mixer and igniter portion of the converter igniter of FIG. 1;

FIG. 3 is a top plan view, partially in section and partially cut away of the converter igniter of FIG. 1; and FIG. 4 is an enlarged view, partially in section and partially cut away of a spark plug and related structure forming a part of the converter igniter of the invention.

DETAILED DESCRIPTION OF THE ILLUSTRATED EMBODIMENT

Referring now to the drawings, initially to FIG. 1 and FIG. 3, a converter igniter in accordance with the invention is designated generally by the reference numeral 10. As previously discussed, this converter igniter is for use in a nitric acid production process, and in particular, in the portion of this process in which vapor phase oxidation of ammonia takes place. Conventionally, a sealed chamber 12 is defined by a surrounding water jacket 14. In this chamber 12, a screen assembly or gauze, comprising one or more pads or sheets of platinum-rhodium screens 16, indicated in phantom line, is provided. In operation, an ammonia and air mixture is passed through the chamber 12 and over the screen or gauze 16. Ignition of the ammonia and air mixture is accomplished by heating the screen 16 to a predetermined temperature. In order to heat or ignite the screen 16, the converter and igniter structure 10 extends into the sealed chamber 12.

In accordance with a feature of the invention, the igniter structure 10 includes an elongated tube 18 and preferably a cylindrical stainless steel tube, which carries an igniter structure 20 at the end thereof within the chamber 12. The elongated tube 18 delivers a flammable gas, and preferably hydrogen, from a source to be described later, to the ignition structure 20. In accordance with another feature of the invention, this ignition structure 20 includes a conventional spark plug 22 held completely within the end portion 24 of the tube 18. Moreover, the end 24 of the tube 18 surrounding the spark plug is provided with a plurality of apertures 26, best seen in FIG. 2. These apertures 26 encourage a controlled mixture of air and hydrogen gases at the spark plug 22, to produce a relatively diffuse flame. Advantageously, this diffuse flame tends to heat a relatively broad area of the screen 16, thus avoiding possible overheating and damage thereto which might occur with a more concentrated flame.

In order to feed a suitable electric current for energizing the spark plug 22, there is provided a second elongated tube 26, also preferably a cylindrical stainless steel tube, concentrically mounted within the tube 18. This tube 26 is preferably of somewhat smaller outer diameter than the inner diameter of the tube 18 and concentrically mounted therein, thus allowing passage of the hydrogen gas through the generally annular space between the respective tubes 26 and 18. Inside of this second tube 26 is carried an elongate rod or electrode 28 which carries the energizing current to the spark plug 22.

Reference is next invited to FIG. 4, wherein the structure of the spark plug 22, tube 26, and electrode or rod 28 is shown in additional detail. The spark plug 22 comprises a conventional spark plug, and preferably an Auburn spark plug assembly number 1501-236-0. Within the tube 26 there is carried the suitable insulator assembly designated generally by the reference numeral 30, surrounding the rod or electrode 28. In the illustrated embodiment, this insulator assembly 30 comprises three concentrically mounted glass pyrex cylindrical tubes 32, 34 and 36 which successively decrease in diameter from generally the inner diameter of the tube 26 to the outer diameter of the rod 28, to securely hold the rod within the tube 26 while at the same time completely electrically insulating this rod 28 and the surrounding stainless steel tube 26 from the outer stainless steel tube 18 which carries the hydrogen gas.

As best viewed in FIG. 4, the electrode rod 28 terminates within the spark plug structure 22, wherein there is provided a conventional porcelain insert or spacer 40 which abuts against the respective ends of the insulating tubes 34 and 36 as illustrated. A suitable internally threaded member such as a nut 42 is welded or otherwise affixed to the end of the steel tube 26 for receiving the externally threaded end 44 of the spark plug 22. This threaded end 44 abuts against the end of the outermost insulating tube 32. Thus, the spark plug is readily coupled with and positioned with respect to the concentric tubes 26, insulating tubes 30 and electrode rod 28.

Referring again to the FIGS. 1 and 3, at the end of tube 18 remote from the chamber 12 there is provided a suitable structure, designated generally by the reference numeral 50, for introducing hydrogen gas to the space between the tubes 26 and 18 and for introducing a suitable energizing electric current to the electrode rod 28. Briefly, this structure 50 includes a chamber 52 defined by an enlarged diameter tubular member 54 which tapers down to a suitable decreased diameter coupling portion 54a for receiving, as by welding, the end of the tube 18. The tube 26 extends through this coupling 54a and into the interior portion of the chamber 52, where it is positioned by means of the suitable clamp structure 56 extending from an outer wall of the chamber 52 and further supported by a transverse strap 58 coupled to opposite sides of the chamber 52. The electrode rod 28 extends somewhat outwardly of the end of the tube 26 where it enters one end of a suitable electrical coupling 60. This coupling 60 receives a second electrode rod 62 at the opposite end thereof and is preferably provided with suitable set screws 64, 66 for securing the respective electrode rods 28 and 62. This latter electrode 62 extends outwardly of the chamber 52 to receive a suitable electric current.

The outer end portion of the chamber 52 is enclosed by a first, generally annular, weld neck flange 68 and a second, generally annular, blind flange 70. The flange 68 includes a tapered leading portion which is suitably joined as by a weldment 72 with the outer end of the tubular member 54 and has an internal diameter substantially similar thereto. The second flange member 70 is joined with the first flange 68 by suitable means such as a plurality of peripherally located threaded fasteners 74, and a seal is provided therebetween by a suitable annular and preferably Teflon sealing ring or gasket 76.

The latter flange 70 is provided with a decreased diameter through bore 78 which threadably and sealingly receives an externally threaded insulator member 80, preferably of Teflon. This insulator member 80 includes a suitable through bore 82 which mounts structure for feeding the rod 62 therethrough while substantially sealing the housing or chamber 52 against leakage of hydrogen gas therefrom. In the illustrated embodiment, this latter structure includes a tube 84 concentrically mounted but spaced apart from the rod 62 and a suitable threaded, sealable coupling designated generally by the reference numeral 86 threadably coupled with an internally threaded end portion of the insulator 80 and preferably welded to the adjacent end of the tube 84. The opposite end of the tube 84 is preferably threaded to receive a nut 88 for securing the opposite end thereof with respect to the insulator 80 and achieving a gas-tight connection with respect to the parts just described. A flammable gas and preferably hydrogen from a suitable supply (not shown) is admitted by way of a suitable valve 90 to a tube 92 which passes into the chamber 52 by way of a suitable bore 94 through a sidewall portion of the tapered end part of the flange 68. Preferably, the tube 92 is secured to the bore 94 by suitable means such as a weldment.

From the foregoing description, it will be seen that hydrogen gas from the tube 92 enters the chamber 52 and hence the tube 18 secured at the tapered end 54 thereof to be carried by the tube 18 to its other end 24 for ignition by the spark plug 22. At the same time, a suitable energizing current for the spark plug 22 enters by way of the rod 62, coupling 60 and rod 28, which are electrically isolated from the hydrogen gas along the length of the tube 18.

Referring now again to the water jacket 14, it will be seen that the tube 18 enters the chamber 12 through the water jacket 14 by way of a suitable sealed coupling structure designated generally by the reference numeral 100. Advantageously, the structure 100 permits slideable movement of the tube 18 in the direction generally indicated by the arrows 102 with respect to the screen 16. Moreover, this assembly 100 permits angular or pivotal motion of the tube 18 both in the direction indicated by the arrows 104 of FIG. 1 and in the direction indicated by the arrows 106 in FIG. 3. Advantageously, then, the tube 18 and, more importantly, the diffuse flame produced by the structure 20 at the end 24 thereof may be readily positioned in three dimensions with respect to the screen 16.

To this end, a through opening 108 is provided in the water jacket 14 by means of a tubular member 110, which is preferably welded thereto. A ball joint 112 is welded to the outer end of the tube 110. This ball joint 112 is preferably of a conventional type, such as a Barco type 0100202, stainless steel, 2-inch ball joint. In this regard, a hollow ball member 114 is carried within a suitable sealed housing structure 116 which maintains the chamber 12 in a sealed condition, while permitting angular movement of the ball 114 therein. The tube 18 is thus fed through the hollow ball member 114 to permit entry of the ignition end 24 thereof into the sealed chamber 12. In order to maintain the chamber 12 sealed from the outside with respect to the hollow portion of the ball 114 through which the tube 18 passes, a suitable sealing structure designated generally by the reference numeral 118 is provided. This structure 118 further permits slideable movement of the tube 18 in the direction generally indicated by the arrows 102. The structure 118 includes a suitable stainless steel bushing 120 which is threadably engaged in a sealed fashion with a suitable internally threaded neck portion at the outer end of the ball 114. This bushing 120 includes at its opposite end a suitable internal thread for receiving an externally threaded coupling 122. This coupling 122 receives at its opposite end a tapered ferrule 124 which is sealably engageable therein by means of a surrounding internally threaded member 126 which threadably engages another external thread provided on this end of the coupling 122.

From the foregoing, it will be seen that threadable advancement of the member 126 tends to tightly engage the seal 124 with the coupling 122, thus sealing the entire assembly and locking the tube 18 in position therein. However, threading retraction of the member 126 permits release of this seal, thereby permitting slideable movement of the tube 118 therethrough for positioning the ignition end 24 thereof. The ball joint 112 permits movement of the tube 18 in the directions 104 and 106 to permit relatively accurate positioning thereof with respect to the screen 16.

In accordance with a preferred form of the invention, a suitable guide track 130 may also be provided for slideable movement of the converter igniter structure 10 generally in the direction indicated by the arrows 102. Additionally, a suitable drive structure in the form of a cable 132 and pulley 134, together with some suitable drive member such as a motor or hand crank (not shown) may be utilized to accomplish movement of the igniter 10 along the track 130. Hence, the cable 132 is coupled with a suitable coupling 136 provided on the housing 52. Generally speaking, gas pressure within the chamber 12 will tend to drive the converter igniter structure 10 back outwardly of the chamber 12 when tension upon the cable 132 is released. The foregoing inward and outward movements of the structure 10 are of course both accomplished with the sealing structure comprising the ferrule 124 and threaded member 126 in their nonsealed condition to permit movement of the tube 18 with respect thereto.

Additionally, and as best seen in FIG. 3, suitable restraining means are provided for defining a maximum retracted position of the igniter structure 10 with respect to the chamber 12. To this end, a pair of chains 140 and 142 are coupled with a ring 144 held securely by the coupling member 120 to the structure 100, which it will be remembered is fixed with respect to the water jacket 14. The opposite ends of these chains 140 and 142 are affixed to respective outer edges of the flange member 94. The length of these chains 140 and 142 may be adjusted to permit a desired degree of retraction of the igniter structure 10, while preventing complete removal of the end 20 of the tube 18 from the chamber 12.

What has been illustrated and described herein is a novel igniter structure for vapor phase ammonia oxidation in a nitric acid plant converter. While the invention has been described above with reference to the preferred embodiment, the invention is not limited thereto. Various changes, alternatives and modifications may become apparent to those skilled in the art upon reading the foregoing description. The invention includes such changes, alternatives and modifications insofar as they fall within the spirit and the scope of the appended claims.

The invention is claimed as follows:

1. A converter igniter for heating a screen located in a sealed chamber sufficiently to ignite a gaseous medium passing therethrough, comprising: means for producing a diffuse flame; tubular conduit means for mounting said flame producing means; and ball joint means having a through opening for slidably mounting said tubular conduit means therethrough; said ball joint means being rotatable for controlling the angular position of said diffuse flame relative to said screen; ferrule means coupled with said tubular conduit means and with said ball joint means for maintaining a seal therebetween while permitting bidirectional axial movement of said tubular conduit means through said ball joint means to permit corresponding adjustment of the position of said diffuse flame relative to the screen; and track means for slideably mounting one end of said tubular conduit means exteriorly of said chamber, cable means coupled with said tubular conduit means and pulley means mounting said cable means for slideably moving said tubular conduit means in a first direction for axial movement of said tubular conduit means through said ball joint means and into said chamber.

2. A converter igniter according to claim 1 wherein said flame producing means includes gas delivery means, electrical igniting means for igniting the gas delivered by said gas delivery means to form a flame and diffuser means for diffusing said flame.

3. A converter igniter according to claim 2 wherein said gas delivery means is coupled to one end of said tubular conduit means and wherein said electrical igniting means comprises spark plug means located near an opposite end of said tubular conduit means, said diffuser means being located in surrounding relationship to said spark plug means.

4. A converter igniter according to claim 3 wherein said tubular conduit means is cylindrical and further including elongate electrical conductor means for delivering an energizing current to said spark plug means, said electrical conductor means being mounted substantially concentrically within said tubular means and insulating means interposed between said conductor means and said tubular conduit means.

5. A converter igniter according to claim 1 and further including restraining means coupled with said tubular conduit means for preventing complete withdrawal of said tubular conduit means with respect to said ball joint means.

6. A converter igniter according to claim 1 wherein said tubular conduit means has an inlet and an outlet for delivering a flow of combustible therethrough, and wherein said flame producing means includes spark plug means mounted within said elongate tubular conduit means adjacent said outlet for igniting said combustible gas and a plurality of apertures in said tubular conduit means in surrounding relation to said spark plug means for encouraging an air-gas mixture during combustion and thereby producing a diffuse flame.

7. A converter igniter according to claim 1 wherein said ferrule means is selectively rotatable in a first direction for permitting slideable movement of said elongate tubular conduit means with respect to said ball joint means through opening and selectively rotatable in a second direction for tightly engaging said elongate tubular conduit means with respect to said ball joint means through opening and preventing further slideable movement therebetween.

8. A converter igniter according to claim 4 wherein said elongate tubular conduit means comprises a cylindrical stainless steel tube coupled to a gas supply, said electrical conductor means comprises an elongate cylindrical stainless steel rod concentrically mounted within said stainless steel tube, said insulating means comprises a glass tubular insulator member concentrically mounted about said rod and spaced apart from the inner wall of said tube, and wherein connector means are provided adjacent opposite ends of said gas delivery tube for coupling said rod conductor respectively with a source of electrical current on the one side and with said spark plug means on the other side, while insulating said electrical current from said combustible gas so as to permit combustion only at said spark plug means.

* * * * *